United States Patent
Hiramatsu et al.

(10) Patent No.: US 6,463,261 B1
(45) Date of Patent: Oct. 8, 2002

(54) RADIO COMMUNICATION DEVICE AND RADIO COMMUNICATION METHOD

(75) Inventors: Katsuhiko Hiramatsu, Yokosuka; Kenichi Miyoshi, Yokohama, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/319,940
(22) PCT Filed: Oct. 14, 1998
(86) PCT No.: PCT/JP98/04637
§ 371 (c)(1), (2), (4) Date: Jul. 30, 1999
(87) PCT Pub. No.: WO99/21298
PCT Pub. Date: Apr. 29, 1999

(30) Foreign Application Priority Data

Oct. 20, 1997 (JP) .............................................. 9-306561

(51) Int. Cl.⁷ ............................................. H04B 15/00
(52) U.S. Cl. ........................ 455/63; 455/502; 455/561; 370/201; 370/519
(58) Field of Search ................................ 455/503, 445, 455/422, 450, 62, 63, 59, 60, 447, 448, 452, 18, 19, 67.3; 370/350, 503, 337, 347, 519, 508

(56) References Cited

U.S. PATENT DOCUMENTS

| | | | | |
|---|---|---|---|---|
| 4,907,290 A | * | 3/1990 | Crompton | 455/524 |
| 5,068,654 A | * | 11/1991 | Husher | 340/903 |
| 5,229,996 A | * | 7/1993 | Backstrom et al. | 370/100.1 |
| 5,307,509 A | * | 4/1994 | Michalon et al. | 455/517 |
| 5,477,539 A | * | 12/1995 | Brown | 370/84 |
| 5,673,260 A | * | 9/1997 | Umeda et al. | 370/342 |
| 5,715,519 A | * | 2/1998 | Saeki et al. | 455/63 |
| 5,754,626 A | * | 5/1998 | Otonari | 379/61 |
| 5,875,402 A | * | 2/1999 | Yamawaki | 455/502 |
| 5,930,248 A | * | 7/1999 | Langlet et al. | 370/347 |
| 5,940,765 A | * | 8/1999 | Haartsen | 455/462 |
| 6,014,376 A | * | 1/2000 | Abreu et al. | 370/350 |
| 6,104,708 A | * | 8/2000 | Bergamo | 370/320 |

FOREIGN PATENT DOCUMENTS

| | | |
|---|---|---|
| JP | 62241404 | 10/1987 |
| JP | 4179322 | 6/1992 |
| JP | 5308333 | 11/1993 |
| JP | 7203543 | 8/1995 |
| JP | 8008810 | 1/1996 |
| JP | 8279800 | 10/1996 |
| JP | 9-84118 | 3/1997 |
| JP | 9116483 | 5/1997 |

OTHER PUBLICATIONS

An English language abstract of JP 5–308333.
An English language abstract of JP 62–241404.
An English language abstract of JP 4–179322.
An English language abstract of JP 7–203543.
An English language abstract of JP 8–279800.
An English language abstract of JP 9–84118.
An English language abstract of JP 8–008810.
An English language abstract of JP 9–116483.

* cited by examiner

Primary Examiner—Edward F. Urban
Assistant Examiner—Charles Craver
(74) Attorney, Agent, or Firm—Greenblum & Bernstein, P.L.C.

(57) ABSTRACT

The radio communication apparatus of the present invention changes the transmission timing of a mobile station of the self station with respect to the transmission timing of a mobile station of a peripheral transmission station. This makes it possible to extract a received signal from the self station even if the mobile station of the self station and the mobile station of the peripheral transmission station use identical unique words.

22 Claims, 21 Drawing Sheets

| CHANNEL TYPE | TRANSMISSION TIMING OFFSET VALUE |
|---|---|
| CONTROL CHANNEL | 0 |
| COMMUNICATION CHANNEL | 3 |

FIG. 21

RADIO COMMUNICATION DEVICE AND RADIO COMMUNICATION METHOD

TECHNICAL FIELD

The present invention relates to apparatuses and methods for radio communications.

BACKGROUND ART

One of methods for eliminating interference generated between a plurality of radio base stations when one station is transmitting and the other is receiving data is disclosed in the Unexamined Japanese Patent Publication No5-308333, etc. This example seeks to increase a communication capacity by carrying out frame synchronization between a plurality of base stations, synchronizing the timing of transmission slots and reception slots between the base stations and thus eliminating interference between the base stations.

On the other hand, as an interference signal elimination apparatus, an adaptive antenna reception apparatus disclosed in the Unexamined Japanese Patent Publication No62-241404, etc. is known. This example seeks to correctly receive a transmission signal from a desired mobile station by using unique words in a transmission signal transmitted from the mobile station to a base station as a reference signal to update and combine weighting coefficients of different antennas.

However, a conventional frame synchronization system controls the transmission timing in such a way that the transmission timing of a desired mobile station and that of an interference mobile station coincide completely. Thus, with a reception apparatus such as an adaptive antenna reception apparatus that eliminates the transmission signal from the interference mobile station (hereinafter referred to as "interference wave") using unique words transmitted from the other mobile station, the self station receives unique words of the desired mobile station and those of the interference mobile station at the same timing, which gives rise to cross talks preventing correct reception of a transmission signal from the desired mobile station (hereinafter referred to as "desired wave").

DISCLOSURE OF INVENTION

It is an object of the present invention to provide a radio communication apparatus and radio communication method capable, even if a mobile station of the self station and another mobile station of a peripheral transmission station use identical unique words, of extracting a received signal from the mobile station of the self station.

This object is achieved by a radio communication apparatus that carries out communications with a desired mobile station at a second transmission timing having an offset over a first transmission timing calculated from at least one transmission timing selected from a group of self station, desired mobile station, interference station and interference mobile station.

BRIEF DESCRIPTION OF DRAWINGS

FIG. 21 is a timing information table in the radio communication apparatus of the above embodiment.

BEST MODE FOR CARRYING OUT THE INVENTION

With reference now to the attached drawings, the embodiments of the present invention applied to a radio transmission apparatus and radio reception apparatus are explained in detail below.

(Embodiment 1)

Embodiment 1 detects the transmission timing of an interference mobile station prior to communications with a desired mobile station, determines a transmission timing offset between the desired wave and interference wave, determines a transmission timing of the desired mobile station having an offset over the transmission timing of the interference mobile station and starts transmission of the desired mobile station at that timing.

Figure 1:
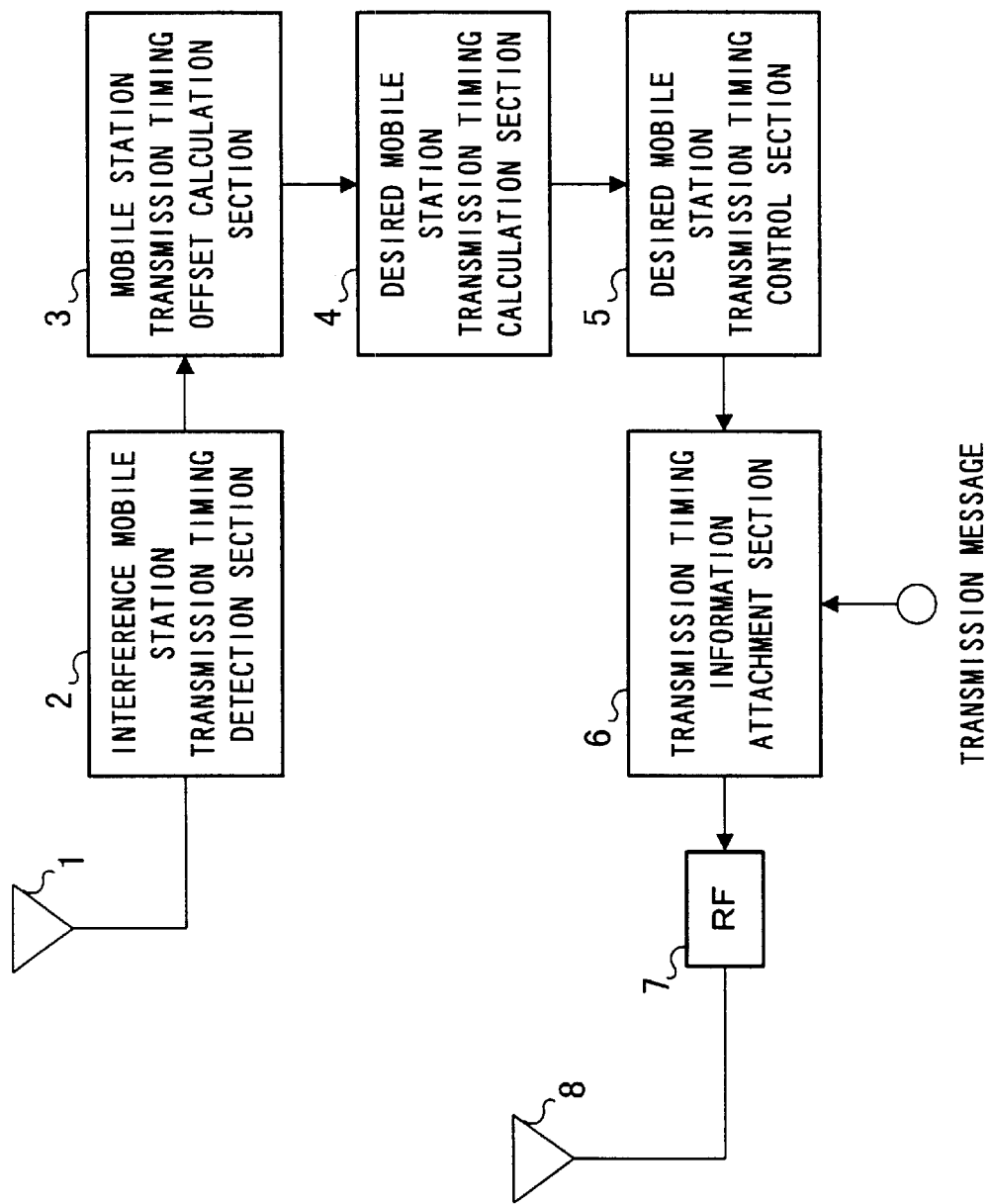
FIG. 1 is a block diagram showing a radio communication apparatus of Embodiment 1 of the present invention.

FIG. 1 shows a block diagram showing a radio communication apparatus of Embodiment 1. This communication apparatus mainly comprises reception antenna 1, interference mobile station transmission timing detection section 2, mobile station transmission timing offset calculation section 3, desired mobile station transmission timing calculation section 4, desired mobile station transmission timing control section 5, transmission timing information attachment section 6, RF transmission section 7 and transmission antenna 8.

In the radio communication apparatus configured as shown above, a signal of the interference mobile station is received from reception antenna 1. Then, the transmission timing of the interference mobile station is detected from the received signal. The transmission timing of the interference mobile station is detected by interference mobile station transmission timing detection section 2.

Mobile apparatus transmission timing offset calculation section 3 calculates a mobile station transmission timing offset value so as to provide an offset between the transmission timing of the interference mobile station and that of the desired mobile station.

Then, desired mobile station transmission timing calculation section 4 calculates a transmission timing of the desired mobile station from the mobile station timing offset value and the transmission timing of the interference mobile station. Desired mobile station transmission timing control section 5 transfers the transmission timing calculated by desired mobile station transmission timing calculation section 4 to transmission timing information attachment section 6.

Transmission timing information attachment section 6 attaches desired mobile station transmission timing information to a transmission message to be sent to the mobile station and transfers it to RF transmission section 7. RF transmission section 7 sends the transmission signal from transmission antenna 8 to the desired mobile station.

According to this configuration, the self station detects the transmission timing of the interference mobile station before starting communications with the desired mobile station, controls the transmission timing of the desired mobile station so as to provide an offset over the transmission timing of the interference mobile station and then starts a communication. This makes it possible to receive unique words of the desired mobile station and unique words of the interference mobile station at different timings and extract the received signal from the mobile station of the self station even if the mobile station of the self station and that of a peripheral transmission station use identical unique words. This allows a reception apparatus such as an adaptive antenna reception apparatus to eliminate interference as well.

(Embodiment 2)

Embodiment 1 determines the transmission timing of a desired mobile station prior to communications with a desired mobile station. Because of this, if an interference mobile station starts communications at the completely same transmission timing as that of the desired mobile station during a communication with the desired mobile station, it is impossible to eliminate interference. Therefore, Embodiment 2 detects the transmission timing of the interference mobile station and that of the desired mobile station after the self station has started communications with the desired mobile station and controls so as to always maintain an offset between the transmission timing of the desired mobile station and that of the interference mobile station.

Figure 2:
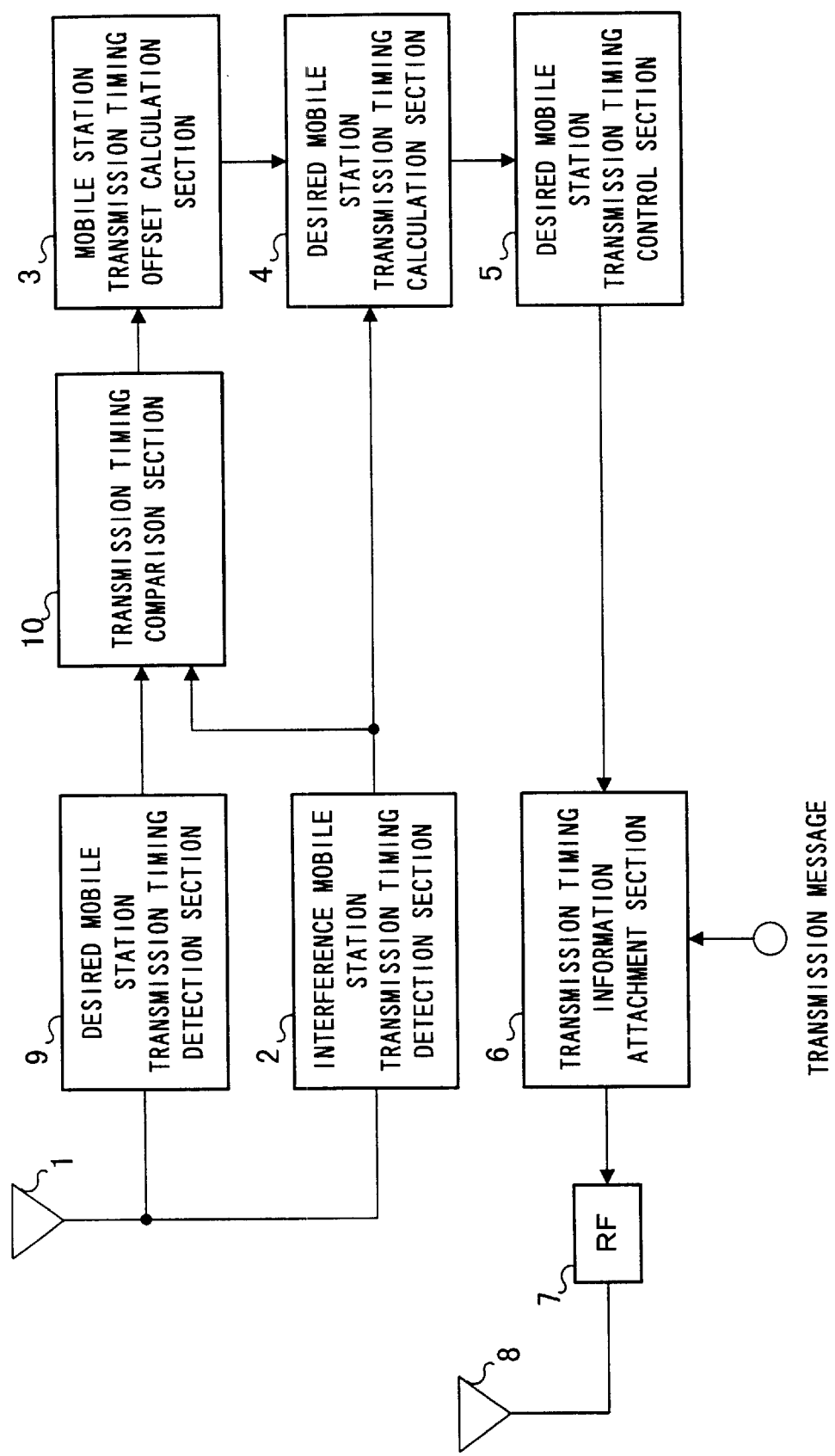
FIG. 2 is a block diagram showing a radio communication apparatus of Embodiment 2 of the present invention.

FIG. 2 is a block diagram showing a radio communication apparatus of Embodiment 2 of the present invention. This radio communication apparatus mainly comprises reception antenna 1, interference mobile station transmission timing detection section 2, desired mobile station transmission timing detection section 9, transmission timing comparison section 10, mobile station transmission timing offset calculation section 3, desired mobile station transmission timing calculation section 4, desired mobile station transmission timing control section 5, transmission timing information attachment section 6, RF transmission section 7 and transmission antenna 8.

In the radio communication apparatus configured as shown above, a signal of the interference mobile station and a signal of the desired mobile station are received from reception antenna 1. The transmission timing of the interference mobile station is detected by interference mobile station transmission timing detection section 2. Moreover, desired mobile station transmission timing detection section 9 detects the transmission timing of the desired mobile station.

Then, transmission timing comparison section 10 compares the transmission timing of the interference mobile station and that of the desired mobile station, finds a difference and transfers this difference to mobile station transmission timing offset calculation section 3. Mobile apparatus transmission timing offset calculation section 3 calculates a mobile station transmission timing offset value so as to provide an offset between the transmission timing of the interference mobile station and that of the desired mobile station.

Then, desired mobile station transmission timing calculation section 4 calculates a transmission timing of the desired mobile station from the mobile station timing offset value and the transmission timing of the interference mobile station. Desired mobile station transmission timing control section 5 transfers the transmission timing calculated by the desired mobile station transmission timing calculation section to transmission timing information assignment section 6.

Transmission timing information attachment section 6 attaches desired mobile station transmission timing information to a transmission message to be sent to the mobile station and transfers it to RF transmission section 7. RF transmission section 7 sends the transmission signal from transmission antenna 8 to the desired mobile station.

According to this configuration, if the interference station starts a communication at a same transmission timing as that of the desired mobile station during another communication with the desired mobile station, mobile station offset information is sent to the desired mobile station so as to provide an offset between the transmission timing of the desired mobile station and that of the interference mobile station, that is, to control the transmission timing of the desired mobile station so as to have an offset over the transmission timing of the interference mobile station.

In this way, an offset is always maintained between the transmission timing of. the interference mobile station and that of the desired mobile station, making it possible to respond to variations in the transmission timing of the interference mobile station. This allows a reception apparatus such as an adaptive antenna reception apparatus to eliminate interference as well.

(Embodiment 3)

Embodiment 1 and Embodiment 2 have a configuration of attaching transmission timing information of a desired mobile station to a signal sent from the self station to the desired mobile station in order to control the transmission timing of the desired mobile station. Because of this, the transmission signal information from the self station to the desired mobile station is reduced by the amount corresponding to the transmission timing information of the desired mobile station.

However, in a system such as a PHS system, the transmission timing of a mobile station follows the transmission timing of a base station. In such a system, controlling the transmission timing of the base station will be sufficient to control the transmission timing of the mobile station, Thus, Embodiment 3 controls the transmission timing of the desired mobile station using a self station transmission timing control section that controls the transmission timing of the self station.

Figure 3:
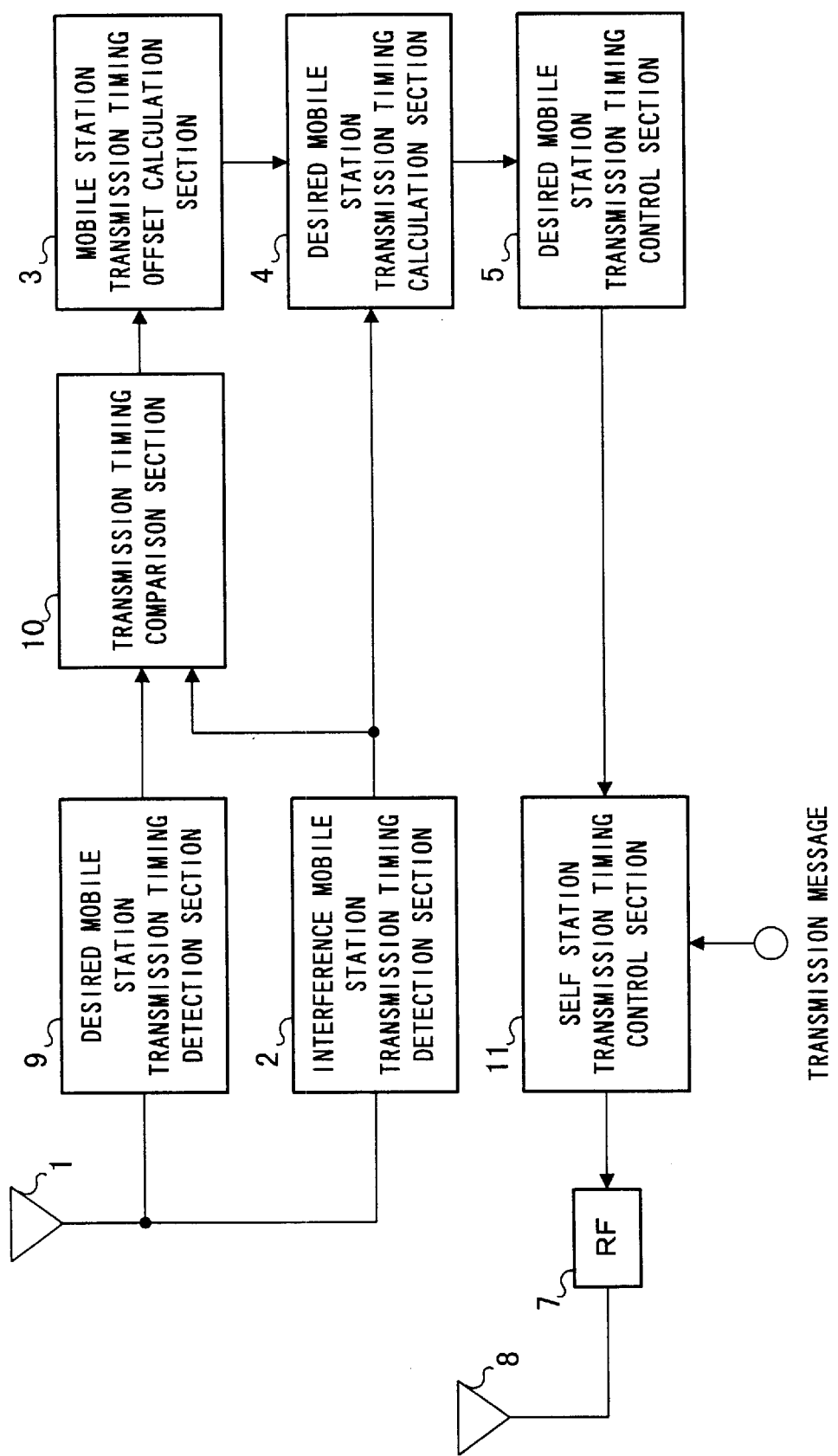
FIG. 3 is a block diagram showing a radio communication apparatus of Embodiment 3 of the present invention.

FIG. 3 is a block diagram showing a radio communication apparatus of Embodiment 3 of the present invention. This communication apparatus mainly comprises reception antenna 1, interference mobile station transmission timing detection section 2, desired mobile station transmission timing detection section 9, transmission timing comparison section 10, mobile station transmission timing offset calculation section 3, desired mobile station transmission timing calculation section 4, desired mobile station transmission timing control section 5, self station transmission timing control section 11, RF transmission section 7 and transmission antenna 8.

In the radio communication apparatus configured as shown above, a signal of the interference mobile station and a signal of the desired mobile station are received from reception antenna 1. The transmission timing of the interference mobile station is detected by interference mobile station transmission timing detection section 2. Moreover, desired mobile station transmission timing detection section 9 detects the transmission timing of the desired mobile station.

Then, transmission timing comparison section 10 compares the transmission timing of the interference mobile station and that of the desired mobile station, finds a difference and transfers this difference to mobile station transmission timing of offset calculation section 3. Mobile station transmission timing offset calculation section 3 calculates a mobile station transmission timing offset value so as to provide an offset between the transmission timing of the interference mobile station and that of the desired mobile station.

Then, desired mobile station transmission timing calculation section 4 calculates a desired mobile station transmission timing from the mobile station timing offset value and the transmission timing of the interference mobile station. Desired mobile station transmission timing control section 5 transfers the transmission timing calculated by the desired mobile station transmission timing calculation section to self station transmission timing control section 11.

Self station transmission timing control section 11 transfers a transmission message to be sent to the mobile station to RF transmission section 7 according to the transmission timing of the desired mobile station. RF transmission section 7 sends the transmission signal from transmission antenna 8 to the desired mobile station.

By controlling the transmission timing of the self station, this configuration allows the transmission timing of the desired mobile station to be controlled even in a system in which the transmission timing of a mobile station follows the transmission timing of a base station. It also makes it possible to control the transmission timing of the desired mobile station without attaching information to a signal to be sent from the self station to the desired mobile station and control so as to maintain an offset between the transmission timing of the interference mobile station and that of the desired mobile station, allowing a reception apparatus such as an adaptive antenna reception apparatus to eliminate interference as well.

(Embodiment 4)

Embodiment 1 and Embodiment 3 explained about the radio communication apparatus that detects the transmission timing of the interference mobile station and creates a difference between the transmission timing of the desired mobile station and that of the interference mobile station. However, since the interference mobile station carries out transmission while traveling around, it is sometimes difficult to correctly extract the transmission timing of the interference mobile station due to influences of variations in the transmission environment, etc. Moreover, in a system such as a PHS system that the transmission timing of a mobile station follows the transmission timing of a base station, the transmission timing of the mobile station can be calculated from the transmission timing of the base station.

Therefore, Embodiment 4 adopts a configuration comprising an interference station transmission timing detection section in which an interference mobile station transmission timing detection section detects the transmission timing of a transmission signal sent from the interference station to the interference mobile station. The interference mobile station transmission timing detection section calculates the transmission timing of the interference mobile station from the output of the interference station transmission timing detection section and outputs the transmission timing of the interference mobile station to a timing comparison section.

Figure 4:
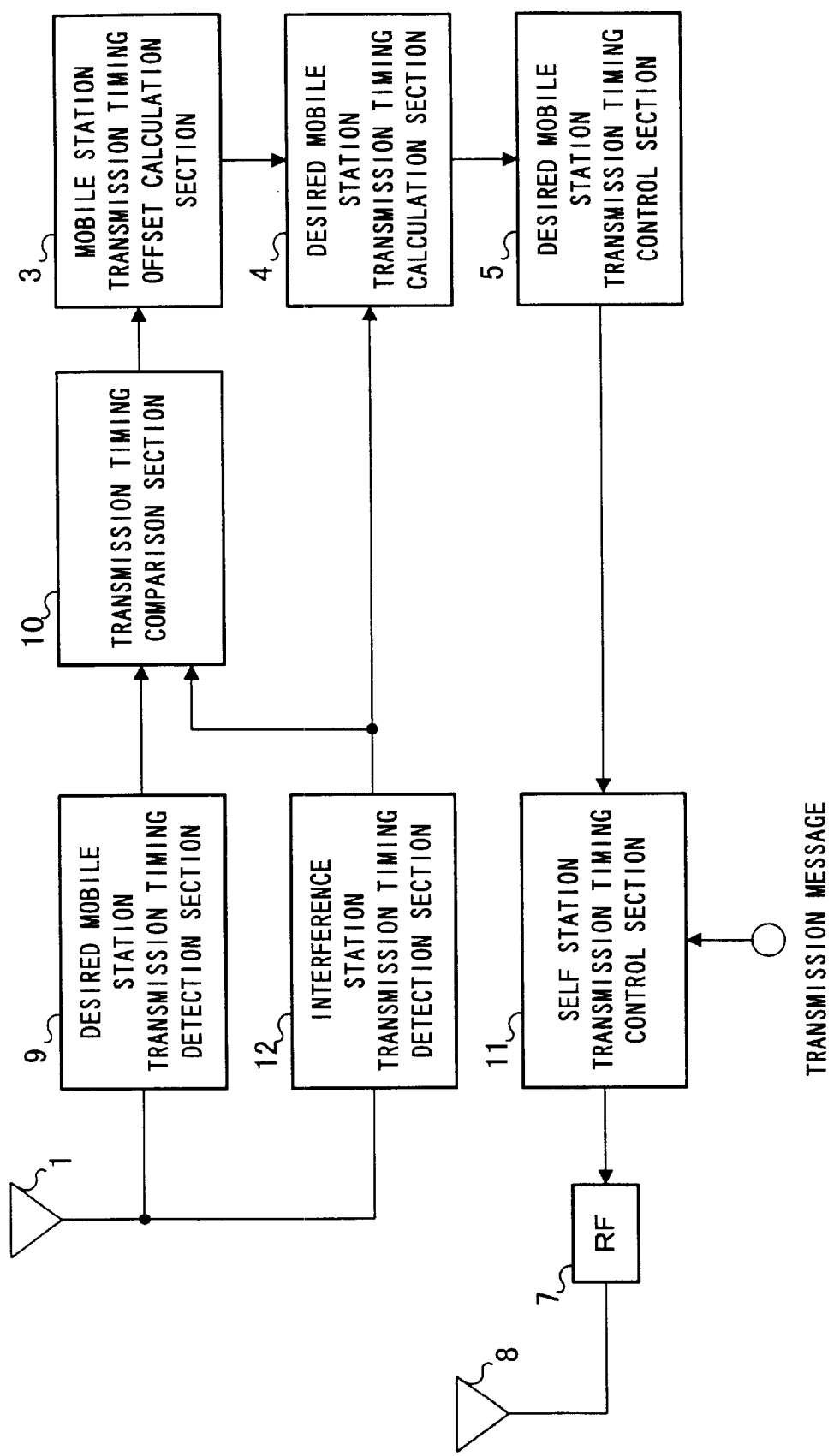
FIG. 4 is a block diagram showing a radio communication apparatus of Embodiment 4 of the present invention.

FIG. 4 is a block diagram showing a radio communication apparatus of Embodiment 4 of the present invention. This radio communication apparatus mainly comprises reception antenna 1, interference station transmission timing detection section 12, desired mobile station transmission timing detection section 9, transmission timing comparison section 10, mobile station transmission timing offset calculation section 3, desired mobile station transmission timing calculation section 4, desired mobile station transmission timing control section 5, self station transmission timing control section 11, RF transmission section 7 and transmission antenna 8.

In the radio communication apparatus configured as shown above, a signal of the interference mobile station and a signal of the desired mobile station are received from reception antenna 1. Interference station transmission timing detection section 12 detects the transmission timing of the interference station. Desired mobile station transmission timing detection section 9 detects the transmission timing of the desired mobile station.

Then, transmission timing comparison section 10 calculates the transmission timing of the interference mobile station from the transmission timing of the interference station, compares the transmission timing of the interference mobile station and that of the desired mobile station, finds a difference and transfers this difference to mobile station transmission timing offset calculation section 3. Mobile station transmission timing offset calculation section 3 calculates a mobile station transmission timing offset value so as to provide an offset between the transmission timing of the interference mobile station and that of the desired mobile station.

Then, desired mobile station transmission timing calculation section 4 calculates a desired mobile station transmission timing from the mobile station timing offset value and the transmission timing of the interference mobile station. Desired mobile station transmission timing control section 5 transfers the transmission timing calculated by the desired mobile station transmission timing calculation section to self station transmission timing control section 11.

Self station transmission timing control section 11 transfers a transmission message to be sent to the mobile station to RF transmission section 7 according to the transmission timing of the desired mobile station. RF transmission section 7 sends the transmission signal from transmission antenna 8 to the desired mobile station.

This configuration makes it possible to correctly calculate the transmission timing of the interference mobile station from the transmission timing of the interference station even if it is impossible to correctly detect the transmission timing of the interference mobile station from the transmission signal from the interference mobile station, and control so as to provide an offset between the transmission timing of the interference mobile station and that of the desired mobile station, allowing, even if a plurality of transmission radio communication apparatuses of the present invention are used simultaneously, a reception apparatus such as an adaptive antenna reception apparatus to eliminate interference as well.

(Embodiment 5)

Embodiment 2 and Embodiment 4 explained about the radio communication apparatus that detects the transmission timing of a desired mobile station and creates a difference between the transmission timing of the desired mobile station and that of the interference mobile station. However, since the interference mobile station carries out transmission while traveling around, it is sometimes difficult to correctly extract the transmission timing of the desired mobile station due to influences of variations in the transmission environment, etc. Moreover, in a system like a PHS system in which the transmission timing of a mobile station follows the transmission timing of a base station, the transmission timing of the mobile station can be calculated from the transmission timing of the base station. Therefore, Embodiment 5 comprises a self station transmission timing detection section in which a desired mobile station transmission timing detection section detects the transmission timing of the self station. The desired mobile station transmission timing detection section calculates the transmission timing of the desired mobile station from the output of the self station transmission timing detection section and outputs the transmission timing of the desired mobile station to a timing comparison section.

Figure 5:
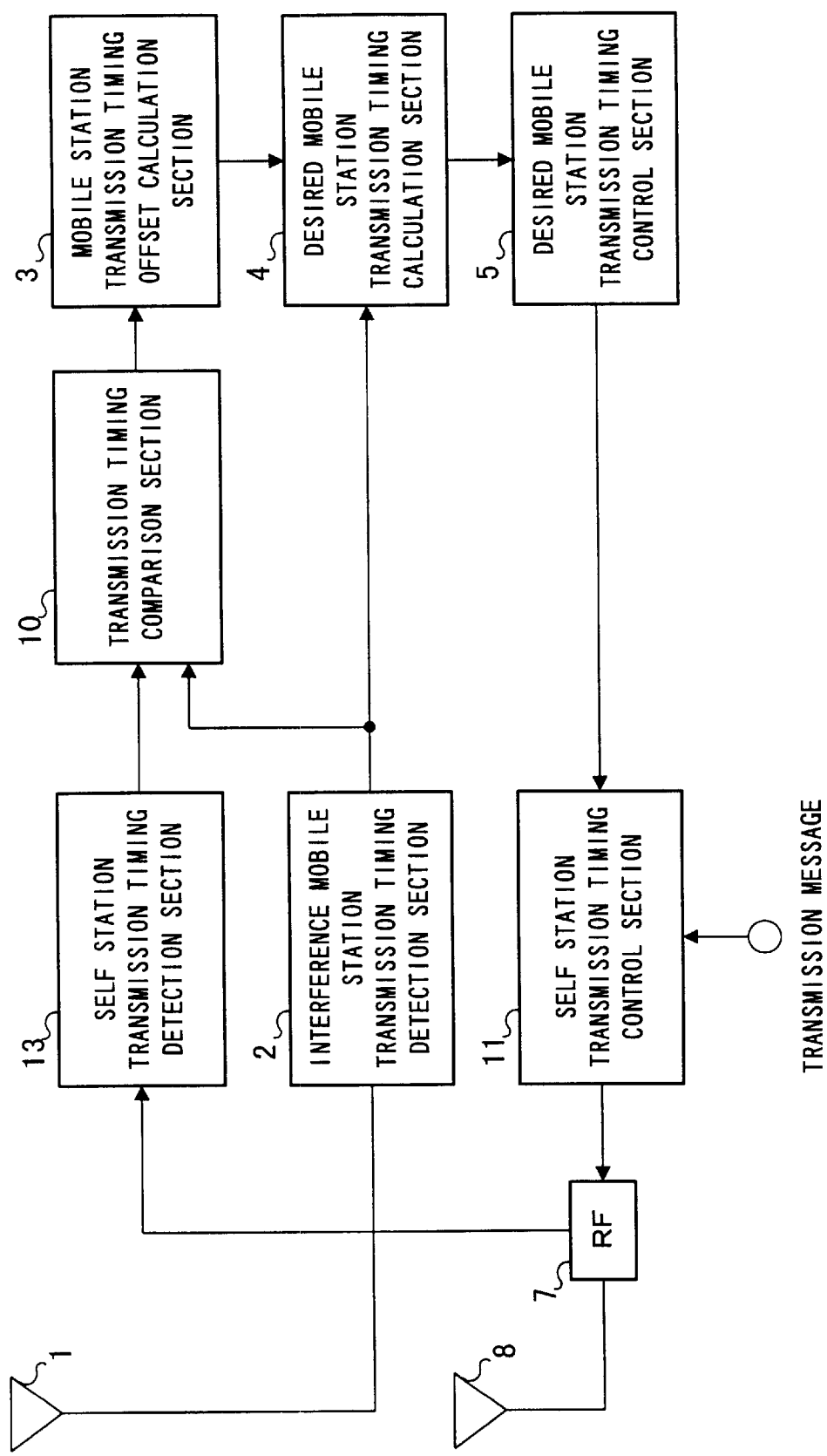
FIG. 5 is a block diagram showing a radio communication apparatus of Embodiment 5 of the present invention.

FIG. 5 is a block diagram showing a radio communication apparatus of Embodiment 5 of the present invention. This communication apparatus mainly comprises reception antenna 1, interference mobile station transmission timing detection section 2, self station transmission timing detection section 13, transmission timing comparison section 10, mobile station transmission timing offset calculation section 3, desired mobile station transmission timing calculation section 4, desired mobile station transmission timing control section 5, self station transmission timing control section 11, RF transmission 15 section 7 and transmission antenna 8.

In the radio communication apparatus configured as shown above, a signal of the interference mobile station is received from reception antenna 1. Interference mobile station transmission timing detection section 2 detects the transmission timing of the interference mobile station. Self station transmission timing detection section 13 detects the transmission timing of the self station from RF transmission section 7.

Transmission timing comparison section 10 detects the transmission timing of the desired mobile station from the transmission timing of the self station, compares the transmission timing of the interference mobile station and that of the desired mobile station and transfers the difference to mobile station transmission timing offset calculation section 3. Mobile station transmission timing offset calculation section 3 calculates a mobile station transmission timing offset value so as to provide an offset between the transmission timing of the interference mobile station and that of the desired mobile station.

Desired mobile station transmission timing calculation section 4 calculates a desired mobile station transmission timing from the mobile station timing offset value and the transmission timing of the interference mobile station. Desired mobile station transmission timing control section 5 transfers the transmission timing calculated by the desired mobile station transmission timing calculation section to self station transmission timing control section 11.

Self station transmission timing control section 11 transfers a transmission message to be sent to the mobile station to RF transmission section 7 according to the transmission timing of the desired mobile station. RF transmission section 7 sends the transmission signal from transmission antenna 8 to the desired mobile station.

This configuration makes it possible to correctly calculate the transmission timing of the desired mobile station from the transmission timing of the self station even if it is impossible to correctly detect the transmission timing of the desired mobile station from the transmission signal from the desired mobile station. It can also control so as to provide an offset between the transmission timing of the interference mobile station and that of the desired mobile station, allowing a reception apparatus such as an adaptive antenna reception apparatus to eliminate interference as well.

(Embodiment 6)

Embodiment 1 and Embodiment 5 have a configuration of creating a difference between the transmission timing of the desired mobile station and that of the interference mobile station by controlling so as to provide an offset between the transmission timing of the desired mobile station and that of the interference mobile station. However, if the difference between the transmission timing of the desired mobile station and that of the interference mobile station increases, the desired mobile station may transmit outside its transmission slots, preventing establishment of frame synchronization.

Figure 7:
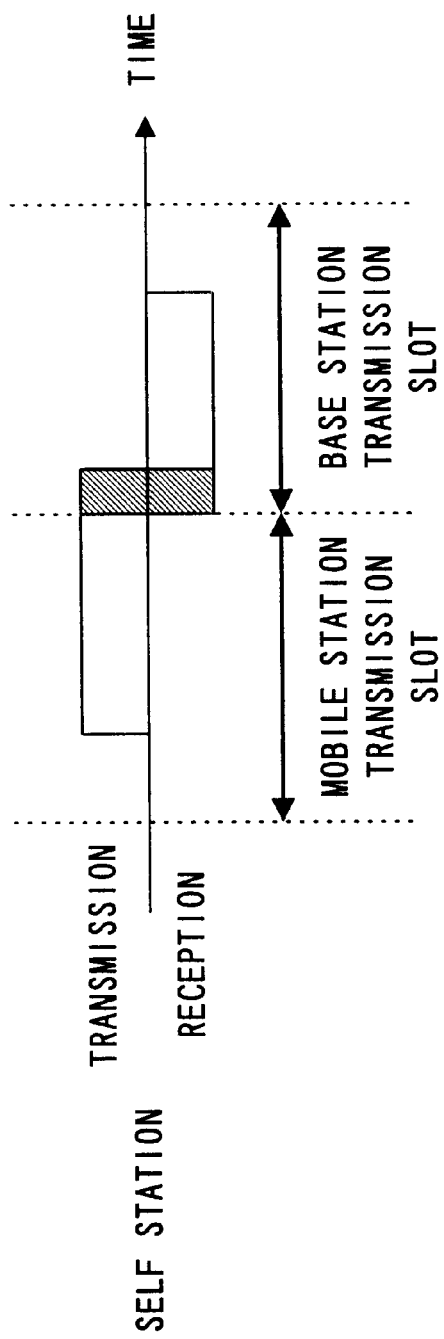
FIG. 7 is a timing chart showing a frame out-of-synchronization state in the radio communication apparatus of the embodiment above.

FIG. 7 is a timing chart of this out-of synchronization state. In FIG. 7, the hatched area represents the base station transmission slot outside the mobile station transmission slot. In this case, the desired mobile station carries out transmission in a base station transmission slot, preventing establishment of frame synchronization, which results in interference with the base station transmission slot.

In order to eliminate such interference, in Embodiment 6, the mobile station transmission timing offset calculation section calculates a transmission timing offset to avoid transmission outside the transmission slot assigned to the desired mobile station of the self station and controls so as to establish frame synchronization.

Figure 8:
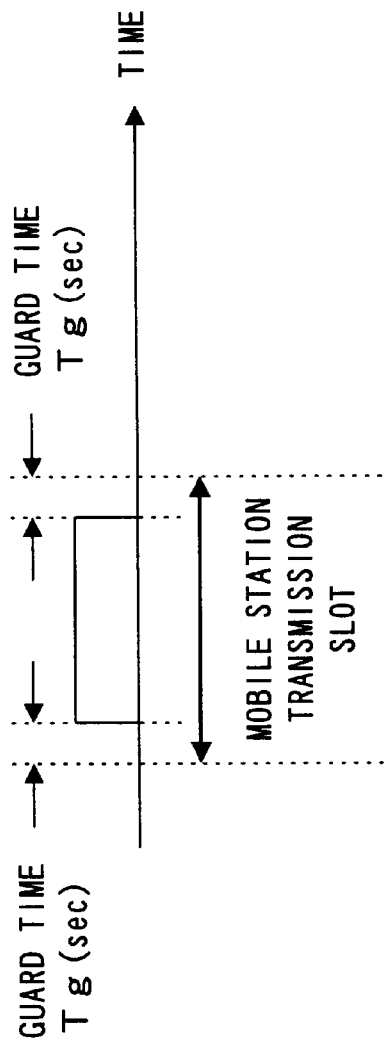
FIG. 8 is a schematic drawing of a guard time in the radio communication apparatus of the embodiment above.

A system like PHS, etc. specifies such a guard time as shown in FIG. 8 before and after the time of actual data transmission in the time slot assigned as the mobile station transmission slot. The sizes of the guard times in FIG. 8 are each Tg sec before and after the transmission slot. Since transmission from the mobile station is not carried out inside a guard time, controlling the transmission timing of the desired mobile station in a time shorter than this guard time can maintain frame synchronization.

Figure 6:
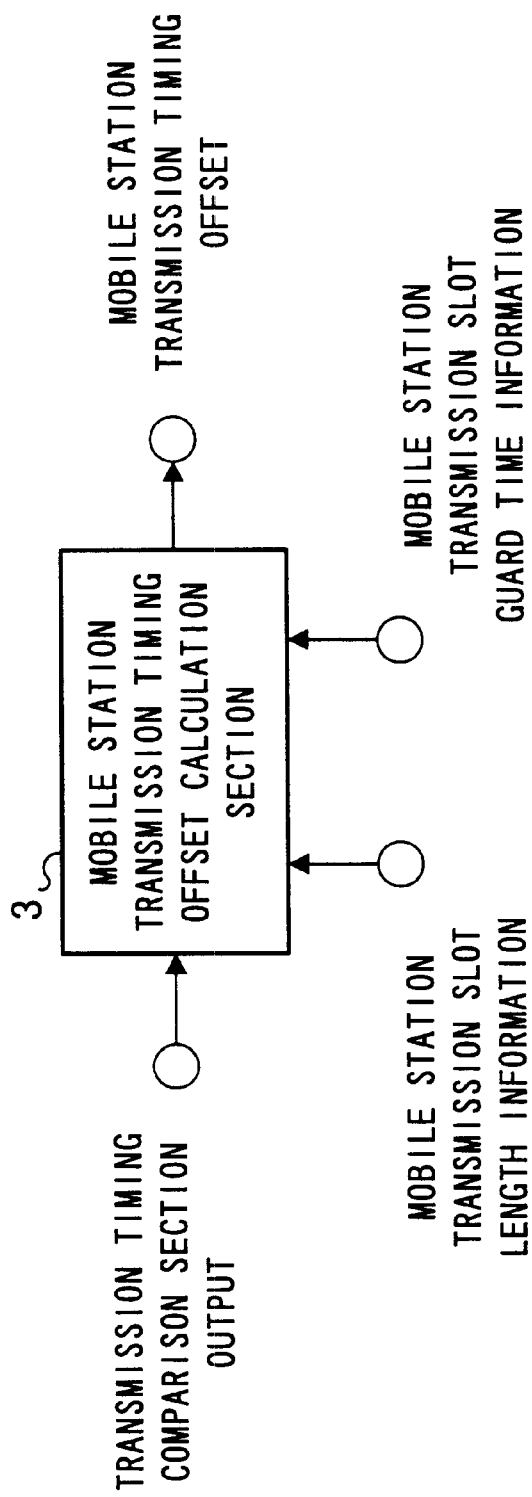
FIG. 6 is a block diagram showing a part of a radio communication apparatus of Embodiment 6 of the present invention.

FIG. 6 is a block diagram showing a part of a radio communication apparatus of Embodiment 6 of the present invention. This radio communication apparatus inputs the output of the transmission timing comparison section, mobile station transmission slot length information and mobile station transmission slot guard time information to transmission timing offset calculation section 3. Transmission timing offset calculation section 3 selects a value of −Tg or greater or Tg or smaller as an offset value.

This configuration controls the transmission timing of the desired mobile station so as to prevent transmission outside the transmission slot assigned to the desired mobile station of the self station, allowing the desired mobile station to avoid interference caused by transmission outside the transmission slot of the desired mobile station, thus maintaining frame synchronization.

(Embodiment 7)

Embodiment 4 has a configuration in which interference station transmission timing control section 12 detects the transmission timing of an interference station and controls the transmission timing of the desired mobile station based on this. However, if a plurality of base station transmission apparatuses with the configuration of Embodiment 4 are used simultaneously, a base station detects the transmission timing of another base station and determines the transmission timing of a mobile station, preventing establishment of frame synchronization between a plurality of base stations.

Figure 10:
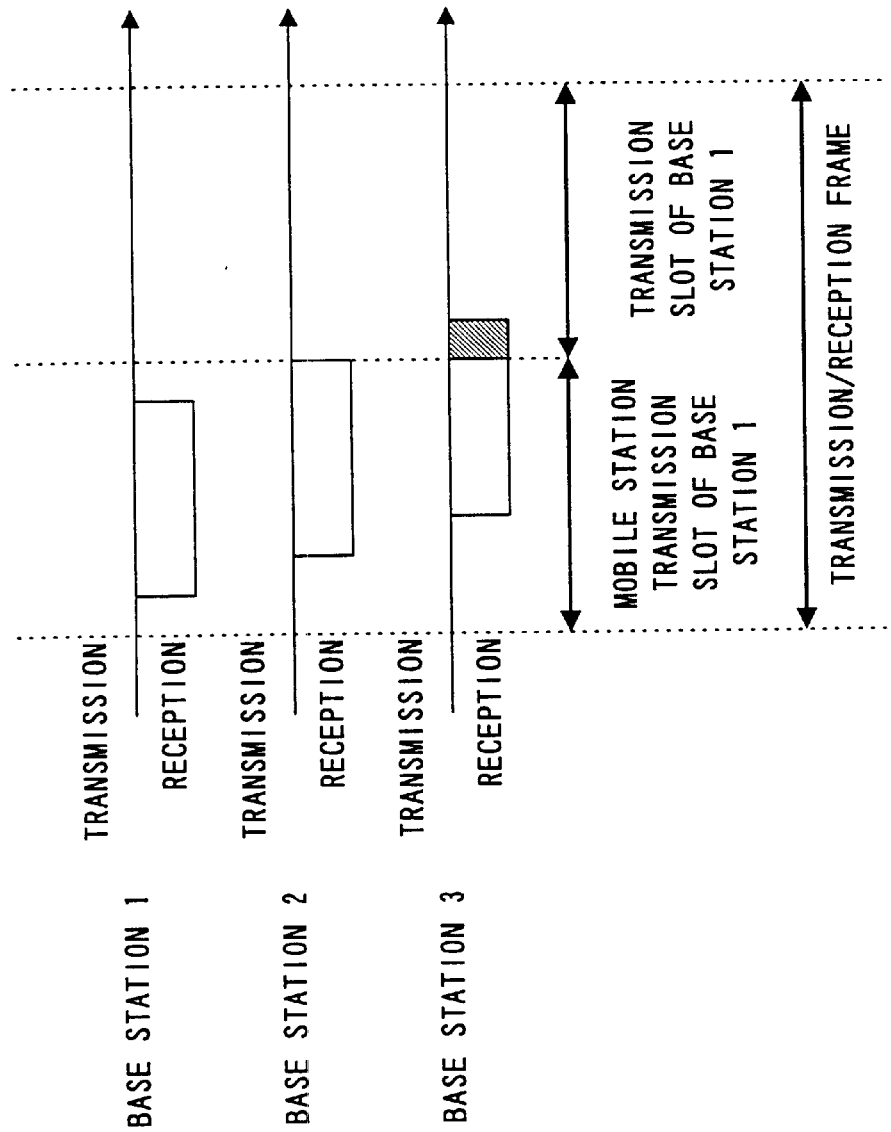
FIG. 10 is a timing chart showing a frame out-of-synchronization state in the radio communication apparatus of the embodiment above.

FIG. 10 is a timing chart of a frame out-of-synchronization state. Here, the mobile station of base station 2 is controlled to maintain an offset corresponding to a guard time with respect to the transmission timing of the mobile station of base station 1. Furthermore, the mobile station of base station 3 is controlled to maintain an offset corresponding to a guard time with respect to the transmission timing of base station 2.

In the case above, the mobile station of base station 3 carries out transmission at a timing with an offset value twice the guard time with respect to the transmission slot of the mobile station of base station 1, and therefore the mobile station of base station 3 is led to carry out transmission using the transmission slot of base station 1 as shown in the hatched area in the figure. This leaves base station 1 and base station 3 in a frame out-of-synchronization state.

Thus, Embodiment 7 has a configuration controlling so that all base stations have a same transmission timing with respect to control channels and only communication channels have a transmission timing offset between different base stations. Furthermore, the base stations have a configuration of detecting only the transmission timing of control channels when detecting the transmission timing of an interference station. This allows, even if a plurality of base stations are used, frame synchronization to be established between all base stations.

Figure 9:
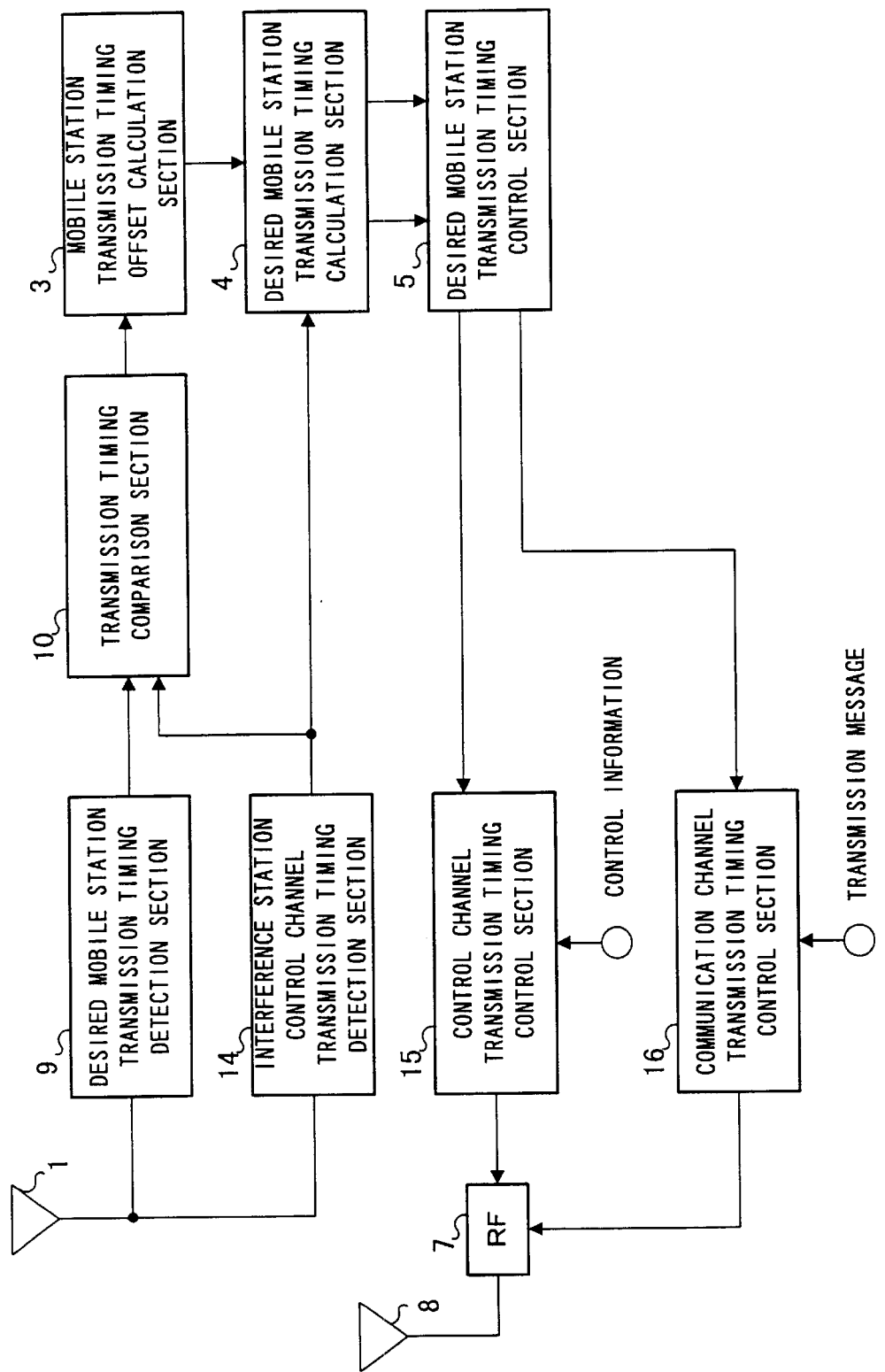
FIG. 9 is a block diagram showing part of a radio communication apparatus of Embodiment 7 of the present invention.

FIG. 9 is a block diagram showing a radio communication apparatus of Embodiment 7 of the present invention. This radio communication apparatus mainly comprises reception antenna 1, desired mobile station transmission timing detection section 9, interference station control channel transmission timing detection section 14, transmission timing comparison section 10, mobile station transmission timing offset calculation section 3, desired. mobile station transmission timing calculation section 4, desired mobile station transmission timing control section 5, control channel transmission timing control section 15, communication channel transmission timing control section 16, RF transmission section 7 and transmission antenna 8.

In the radio communication apparatus configured as shown above, a signal of the interference station control channel and a signal of the desired mobile station are received from reception antenna 1. Interference station control channel transmission timing detection section 14 detects the transmission timing of the interference station control channel. Desired mobile station transmission timing detection section 9 detects the transmission timing of the desired mobile station.

Transmission timing comparison section 10 calculates the transmission timing of the interference mobile station control channel from the transmission timing of the interference station control channel, compares the transmission timing of the interference mobile station control channel and that of the desired mobile station and transfers the difference to mobile station transmission timing offset calculation section 3. Mobile station transmission timing offset calculation section 3 calculates a mobile station transmission timing offset value so as to provide an offset between the transmission timing of the interference mobile station control channel and that of the desired mobile station communication channel.

Desired mobile station transmission timing calculation section 4 calculates the transmission timing of the desired mobile station control channel and the transmission timing of the desired mobile station communication channel from the mobile station timing offset value and the transmission timing of the interference control channel. Desired mobile station transmission timing control section 5 transfers the transmission timing of the control channel calculated by the desired mobile station transmission timing calculation section to control channel transmission timing control section 15 and transfers the transmission timing of the communication channel to communication channel transmission timing control section 16.

Control channel transmission timing control section 15 transfers a control message to be sent to the mobile station to RF transmission section 7 according to the control channel transmission timing. Communication channel transmission timing control section 16 transfers a communication message to be sent to the mobile station to RF transmission section 7 according to the communication channel transmission timing. RF transmission section 7 sends the control channel signal and communication channel signal from transmission antenna 8 to the desired mobile station.

Figure 11:
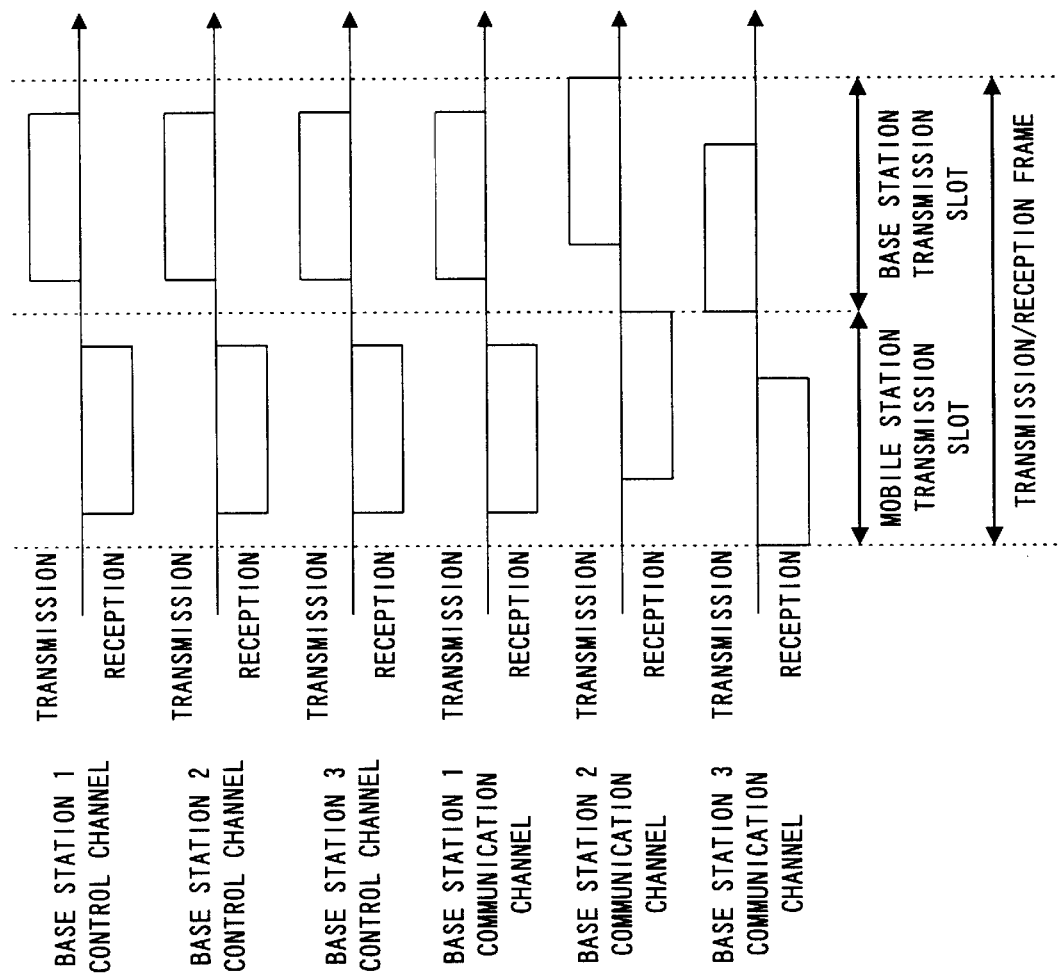
FIG. 11 is a timing chart showing a frame synchronization state in the radio communication apparatus of the embodiment above.

FIG. 11 shows a timing chart of a frame synchronization state. As seen from FIG.11, under control by the present embodiment, the transmission timing of control channels of all base stations is maintained constant and only the transmission timing of communication channels of mobile stationes is changed.

This configuration allows only the transmission timing of communication channels of mobile stations to be changed while maintaining the transmission timing of control channels of all base stations. Such control allows, while maintaining frame synchronization between base stations, unique words transmitted from mobile station s to be received by all base stations at different timings, making it possible to eliminate interference.

(Embodiment 8)

Embodiment 1 has a configuration of providing an offset for the transmission timing of a desired mobile station over the transmission timing of an interference mobile station. However, if a plurality of transmission apparatuses of the present invention are used, the timing offset values of the mobile stationes of the respective transmission apparatuses may be identical, resulting in a same transmission timing for the desired and interference mobile stationes, generating interference.

Figure 13:
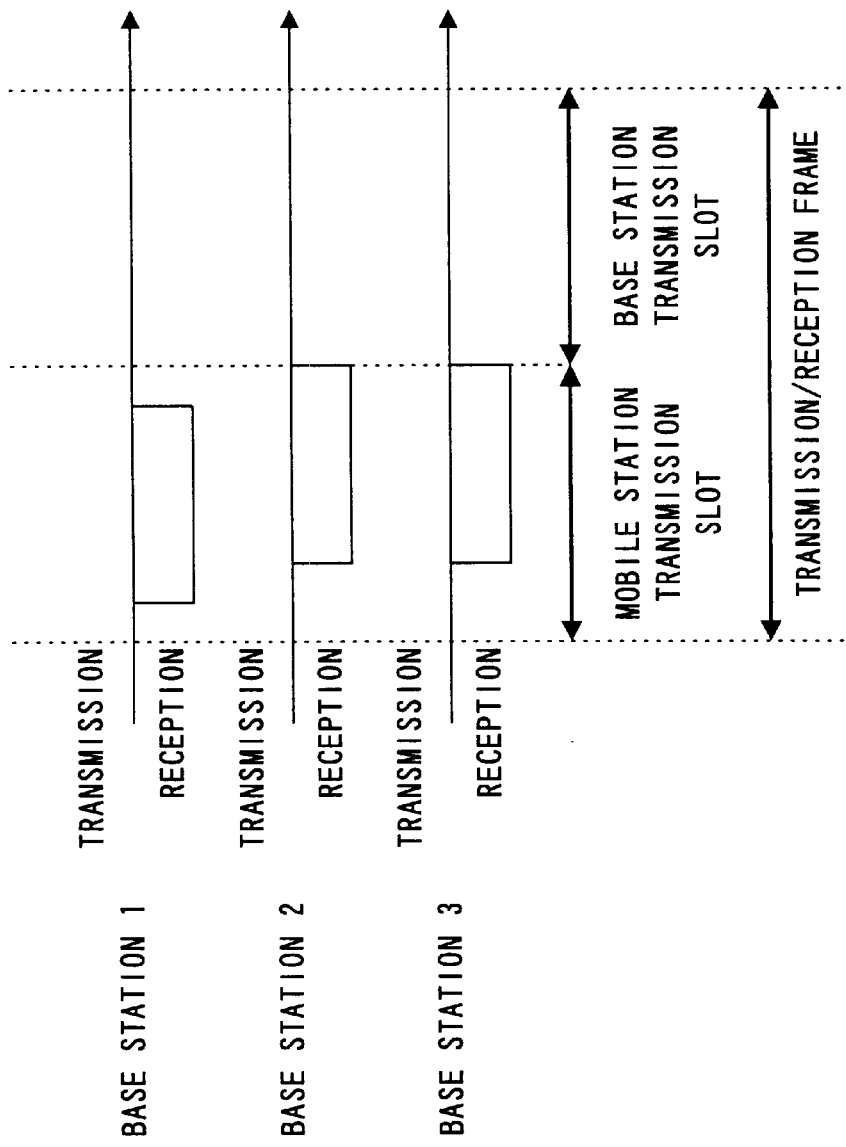
FIG. 13 is a timing chart showing an interference state in the radio communication apparatus of the embodiment above.

FIG. 13 shows a timing chart of an interference state. FIG. 13 shows a case where base station 2 and base station 3 each synchronize with base station 1 with a same transmission timing offset value. Since the same transmission timing offset value is calculated between base station 2 and base station 3, it is possible to eliminate interference between base station 1 and base station 2 and between base station 1 and base station 3. But since unique words are transmitted at a same timing between base station 2 and base station 3, it is not possible to eliminate interference between these stations.

In order to eliminate such interference, Embodiment 8 has a configuration in which a mobile station timing offset calculation section calculates a timing which varies depending on the transmission apparatus. This allows such control that the transmission timing varies from one mobile station to another of every base station.

Figure 12:
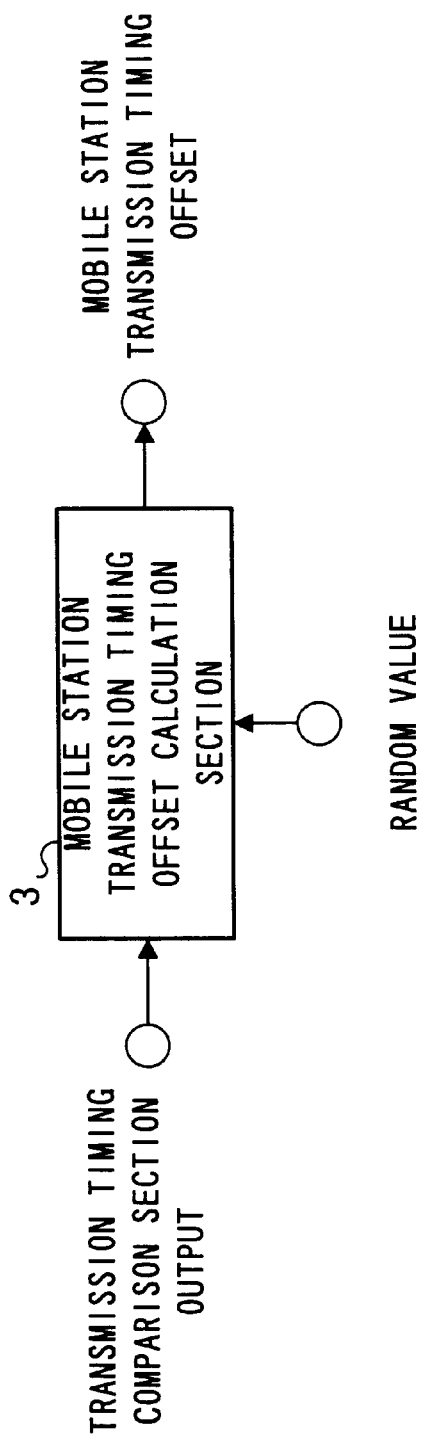
FIG. 12 is a block diagram showing a part of a radio communication apparatus of Embodiment 8 of the present invention.

FIG. 12 is a block diagram showing a part of a radio communication apparatus of Embodiment 8 of the present invention. Mobile station transmission timing offset calculation section 3 receives a value (hereinafter referred to as "random value") that varies from one apparatus to another so that it can calculate a mobile station transmission timing offset value that varies depending on the apparatus. Mobile station transmission timing offset calculation section 3 outputs a mobile station transmission timing offset that varies depending on the apparatus based on the output of the transmission timing comparison section and the input random value.

Figure 14:
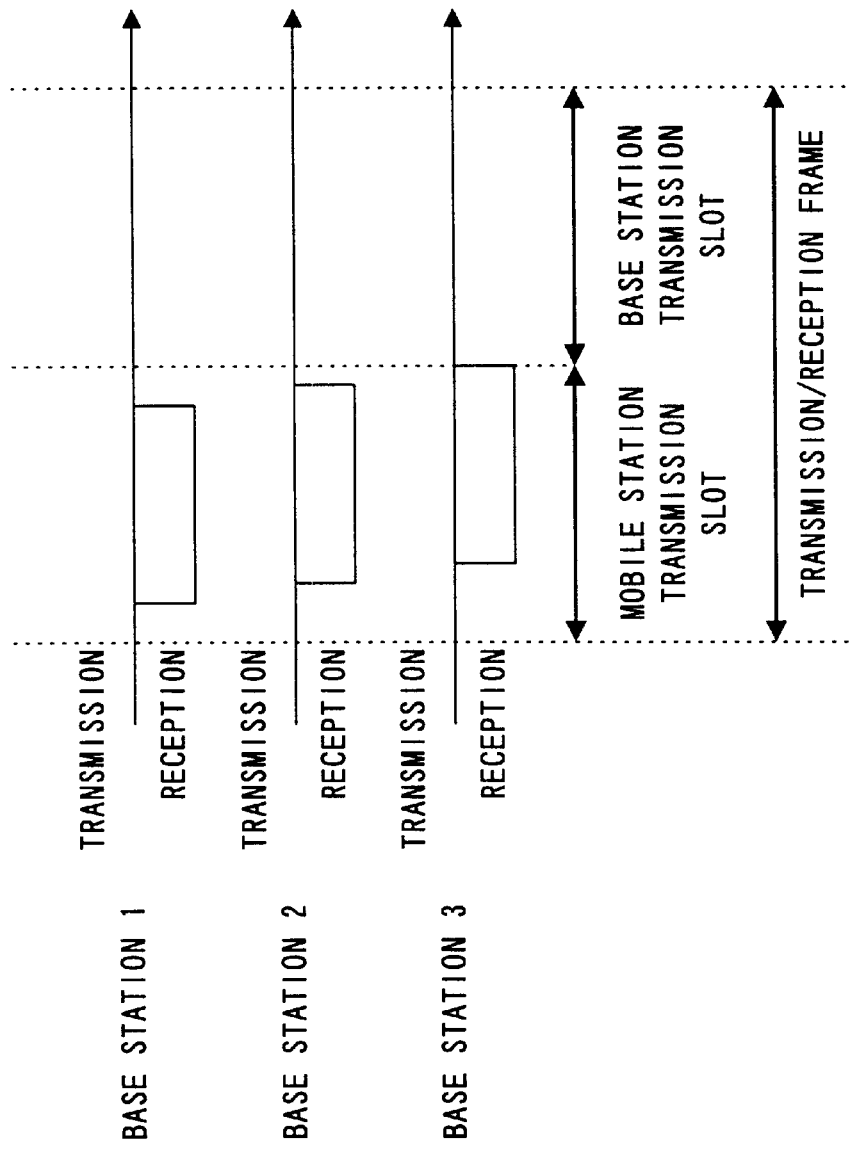
FIG. 14 is a timing chart showing an interference avoided state in the radio communication apparatus of the embodiment above.

FIG. 14 is a timing chart of an interference avoided state, that is, a timing chart when carrying out control according to the present embodiment that changes a transmission timing offset depending on the base station.

Base station 2 and base station 3 are each frame-synchronized with base station 1. Since the mobile station of base station 2 and that of base station 3 carry out transmission at mutually different timings, all mobile stationes of base stations 1, 2 and 3 have different transmission timings.

According to this configuration, the mobile stationes of all base stations carry out transmission with mutually different mobile station transmission timing offset values, and even a reception apparatus like an adaptive antenna reception apparatus can eliminate interference at all base stations. Therefore, even if a plurality of transmission radio communication apparatuses of the present invention are used simultaneously, it is possible to eliminate interference.
(Embodiment 9)

Embodiment 1 has a configuration in which the transmission timing of a desired mobile station is changed with respect to the transmission timing of an interference mobile station. However, if the desired mobile station or interference mobile station moves after transmission has been started, the transmission timing of the desired mobile station may coincide with that of the interference mobile station after the start of transmission.

Thus, Embodiment 9 has a configuration in which the mobile station timing offset calculation section calculates a mobile station timing in such a way that the transmission timing of the desired mobile station goes behind that of the interference mobile station.

Figure 15:
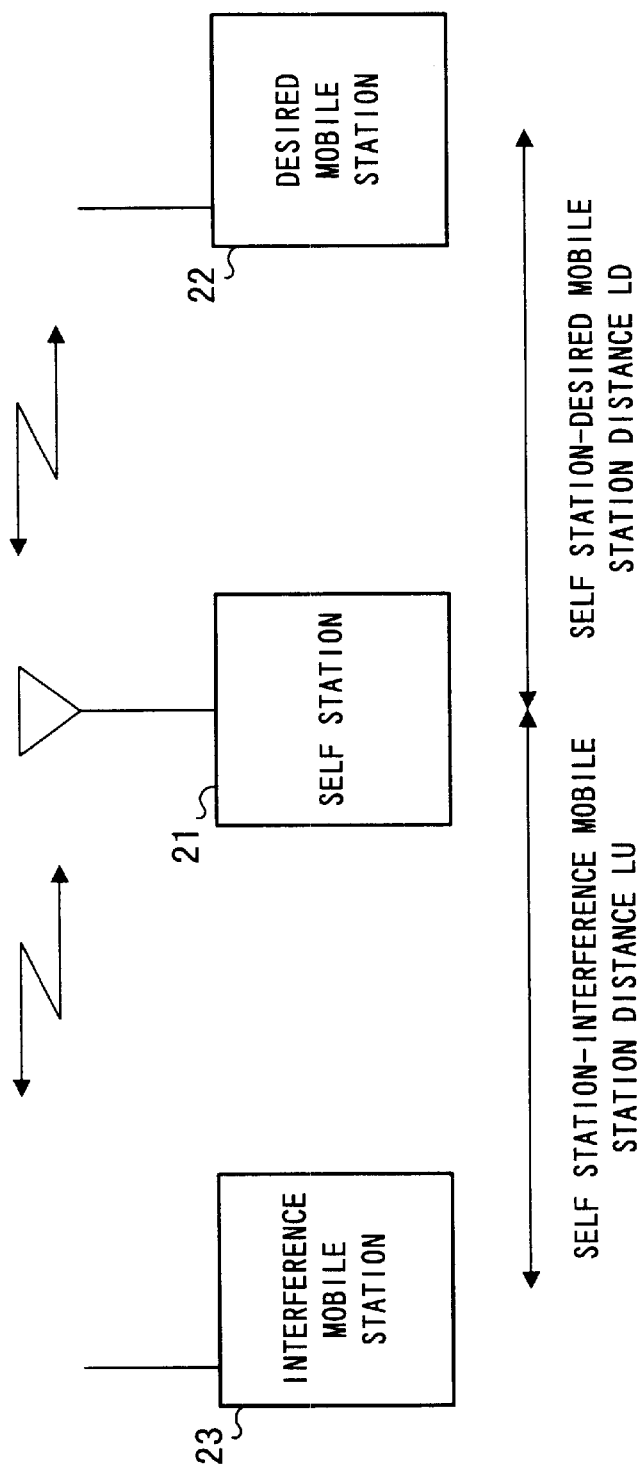
FIG. 15 is a drawing showing the positional relationship between a base station and mobile station in a radio communication apparatus of Embodiment 9 of the present invention.

FIG. 15 is a drawing showing a positional relationship between a base station and mobile station. If self station 21, interference mobile station 23 and desired mobile station 22 are located as shown in FIG. 15, suppose the distance between self station 21 and interference mobile station 23 is LU and the distance between self station 21 and desired mobile station 22 is LD.

Figure 16:
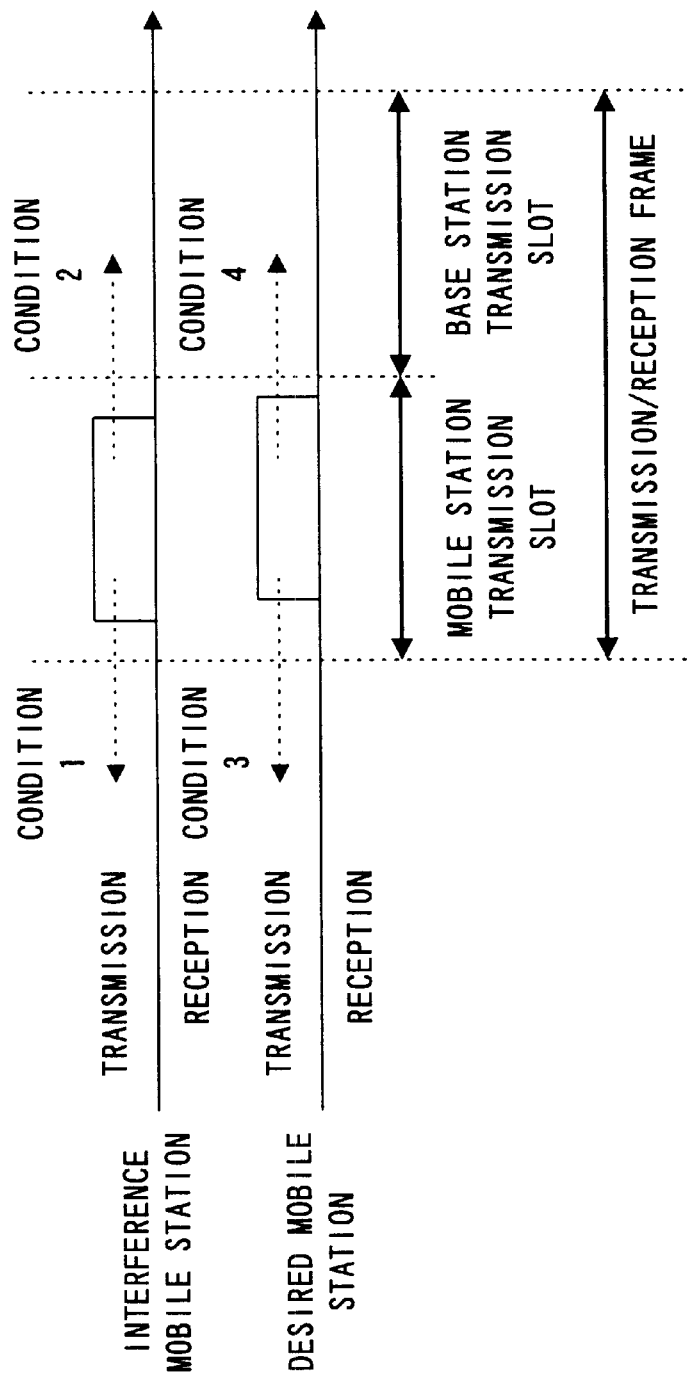
FIG. 16 is an explanatory timing chart of the radio communication apparatus of the above embodiment.

FIG. 16 is an explanatory timing chart of the present embodiment. In Embodiment 1, transmission to desired mobile station 22 is started by controlling it at a timing provided with an offset over the transmission timing of interference mobile station 23. In this case, the transmission timings of desired mobile station 22 and interference mobile station 23 change under the following conditions:

Condition 1: When interference mobile station 23 comes closer to self station 21, the transmission timing of interference mobile station 23 goes ahead.

Condition 2: When interference mobile station 23 goes farther from self station 21, the transmission timing of interference mobile station 23 goes behind.

Condition 3: When desired mobile station 22 comes closer to self station 21, the transmission timing of desired mobile station 22 goes ahead.

Condition 4: When desired mobile station 22 goes farther from self station 21, the transmission timing of desired mobile station 22 goes behind.

First, a case where the transmission timing of desired mobile station 22 is controlled at the start of transmission to go ahead of the transmission timing of interference mobile station 23 is explained. In this case, the transmission timing of desired mobile station 22 may coincide with the transmission timing of interference mobile station 23 under Condition 1 or Condition 4. Furthermore, since distance LU between self station 21 and interference mobile station 23 is smaller than distance LD between self station 21 and desired mobile station 22 under Condition 1 or Condition 4, the ratio of desired signal power to interference signal power decreases, which makes it impossible to extract a received signal from desired mobile station 22 at the start of transmission.

Then, a case where the transmission timing of desired mobile station 22 is controlled at the start of transmission to go behind the transmission timing of interference mobile station 23 is explained. Also in this case, the transmission timing of desired mobile station 22 may coincide with the transmission timing of interference mobile station 23 under Condition 2 or Condition 3.

However, in the case of Condition 2 or Condition 3, since distance LU between self station 21 and interference mobile station 23 is greater than distance LD between self station 21 and desired mobile station 22, the ratio of desired signal power to interference signal power increases, which increases the possibility of extracting a received signal from desired mobile station 22 even if the transmission timing of the desired station coincides with that of the interference station.

Thus, configuring mobile station transmission timing offset calculation section 3 so as to calculate the mobile station transmission timing in such a way that the transmission timing of desired mobile station 22 goes behind the transmission timing of interference mobile station 23 increases the possibility of eliminating interference even after the start of communication and extracting a received signal from desired mobile station 22. Therefore, even if the desired mobile station or interference mobile station has moved, it is still possible to increases the possibility of eliminating interference.
(Embodiment 10)

Figure 17:
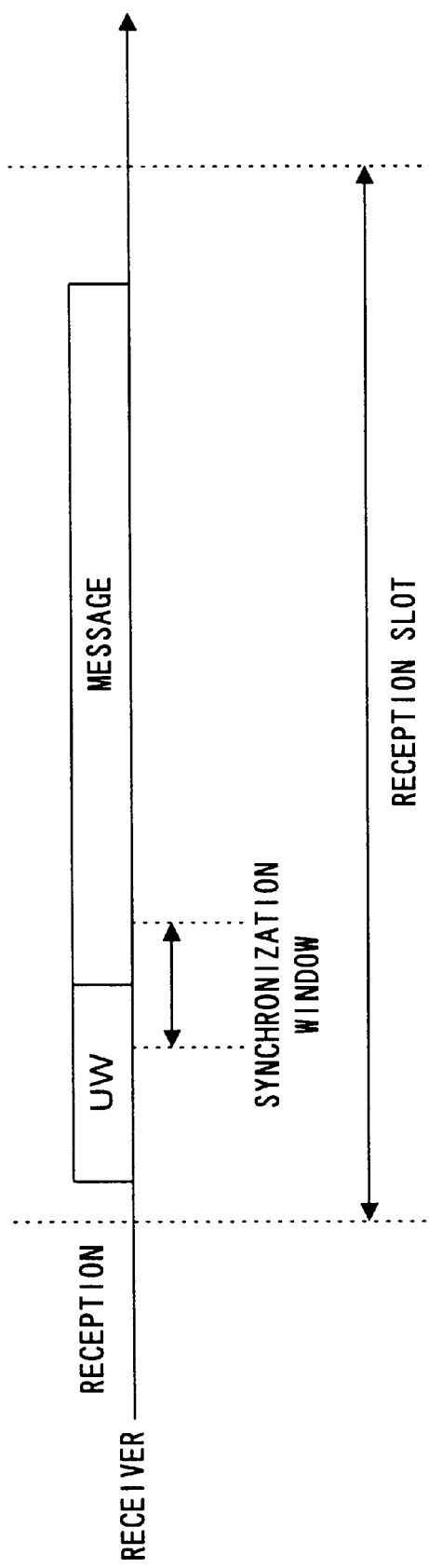
FIG. 17 is a timing chart of a radio communication apparatus of Embodiment 10 of the present invention.

FIG. 17 is a timing chart to explain a synchronization window. A radio communication apparatus (reception apparatus) comprises a synchronization circuit to synchronize with a received signal. In order to synchronize with the received signal, the synchronization circuit uses, for example, detection of a unique word (UW) as a synchronization timing. The synchronization circuit only synchronizes with the received signal when it has detected a synchronization timing in a specific range (hereinafter referred to as "synchronization window") of the reception slot.

Figure 18:
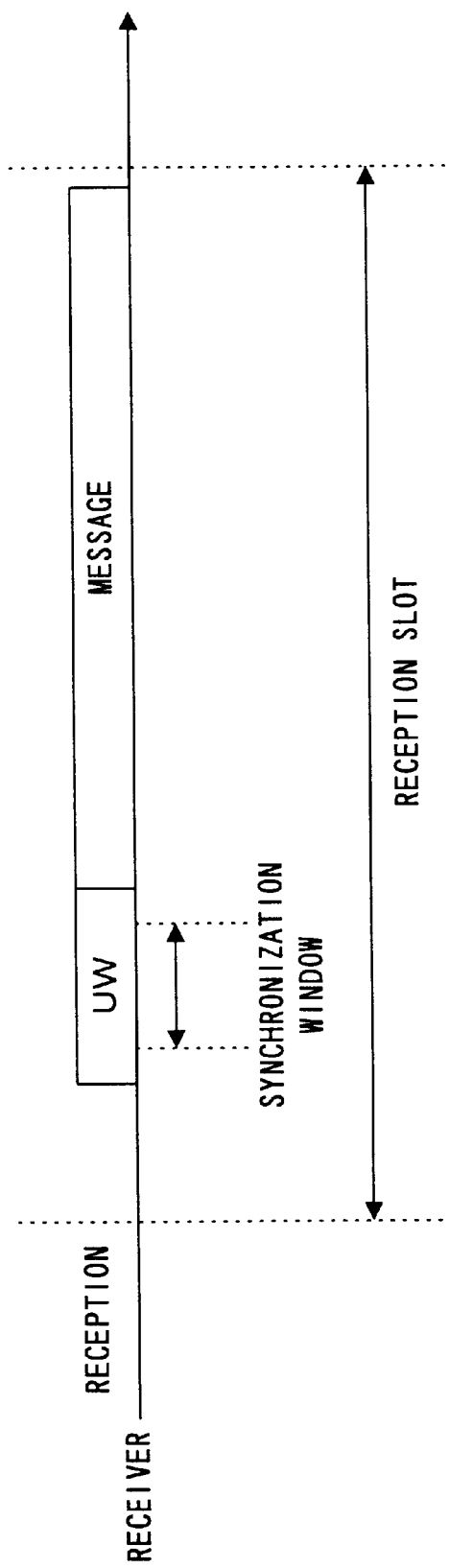
FIG. 18 is a timing chart of the radio communication apparatus of the above embodiment.

FIG. 18 is a timing chart when no synchronization is established with the received signal. When a unique word is detected outside the synchronization window as shown in FIG. 18, the synchronization circuit does not synchronize with the received signal. If such a reception apparatus receives a transmission signal from the radio communication apparatus (transmission apparatus) in Embodiment 2, 3 or 7, it changes the transmission timing after the transmitter has started a communication, and therefore the reception timing of the receiver changes during the communication. Because of this, the receiver cannot resynchronize unless it widens the synchronization window. Widening the synchronization window increases the time of synchronization.

Therefore, Embodiment 10 has a configuration in which the receiver detects transmission timing information of the transmitter and controls the synchronization window position according to the transmission timing. This allows, even if the transmission timing of the transmitter changes, synchronization to be reestablished by only changing the synchronization window position according to a transmission timing offset, eliminating the necessity of widening the synchronization window, which will accelerate synchronization.

Figure 19:
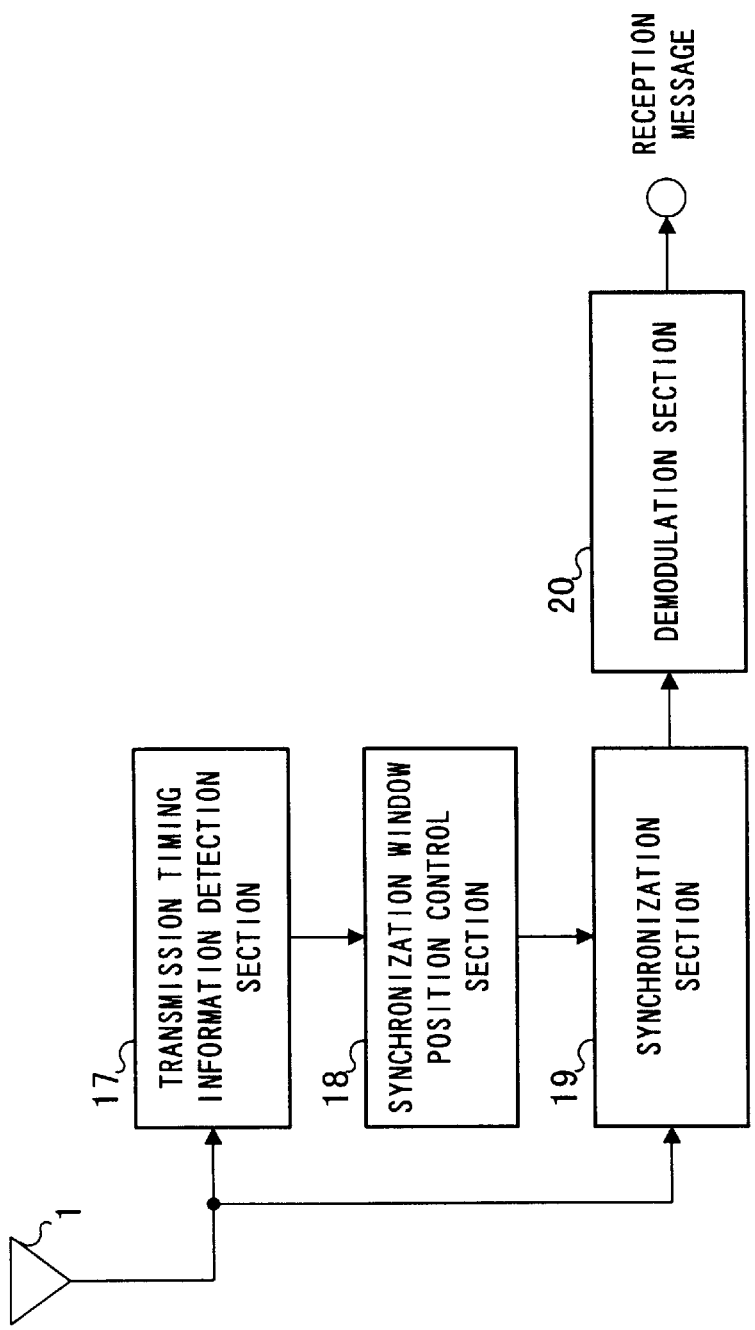
FIG. 19 is block diagram showing the radio communication apparatus of the above embodiment.

FIG. 19 is block diagram showing a radio communication apparatus of Embodiment 10 of the present invention. This radio communication apparatus mainly comprises reception antenna 1, transmission timing information detection section 17, synchronization window position control section 18, synchronization section 19 and demodulation section 20.

In the radio communication apparatus configured as shown above, a signal is received from reception antenna 1. Transmission timing information detection section 17 detects transmission timing information attached to the received signal. Synchronization window position control section 18 calculates the synchronization timing from the transmission timing and controls synchronization section 19 based on this. Synchronization section 19 changes the synchronization window position according to control by synchronization window control section 18. Demodulation section 20 demodulates the received signal according to synchronization control by the synchronization section and outputs a reception message.

This configuration allows, even if the transmitter changes the transmission timing, synchronization with the received signal to be reestablished by controlling the synchronization window position based on the transmission timing information attached to the transmission signal by the transmitter, without the necessity of widening the synchronization window, which will accelerate synchronization even if the transmission timing has been changed.

(Embodiment 11)

The reception apparatus in Embodiment 10 controls the synchronization window position of the receiver by detecting a transmission timing offset in a transmission signal. However, in the case of transmission from a transmission apparatus that does not attach transmission timing information to the transmission signal, the receiver cannot control the synchronization window position.

If a transmission signal is received from a transmission apparatus that predetermines a transmission timing offset according to the channel type, it is possible to determine the synchronization window position based on that information.

Thus, Embodiment 11 adopts a configuration in which a receiver controls the channel type and transmission timing information and controls the synchronization window position for every channel type.

Figure 20:
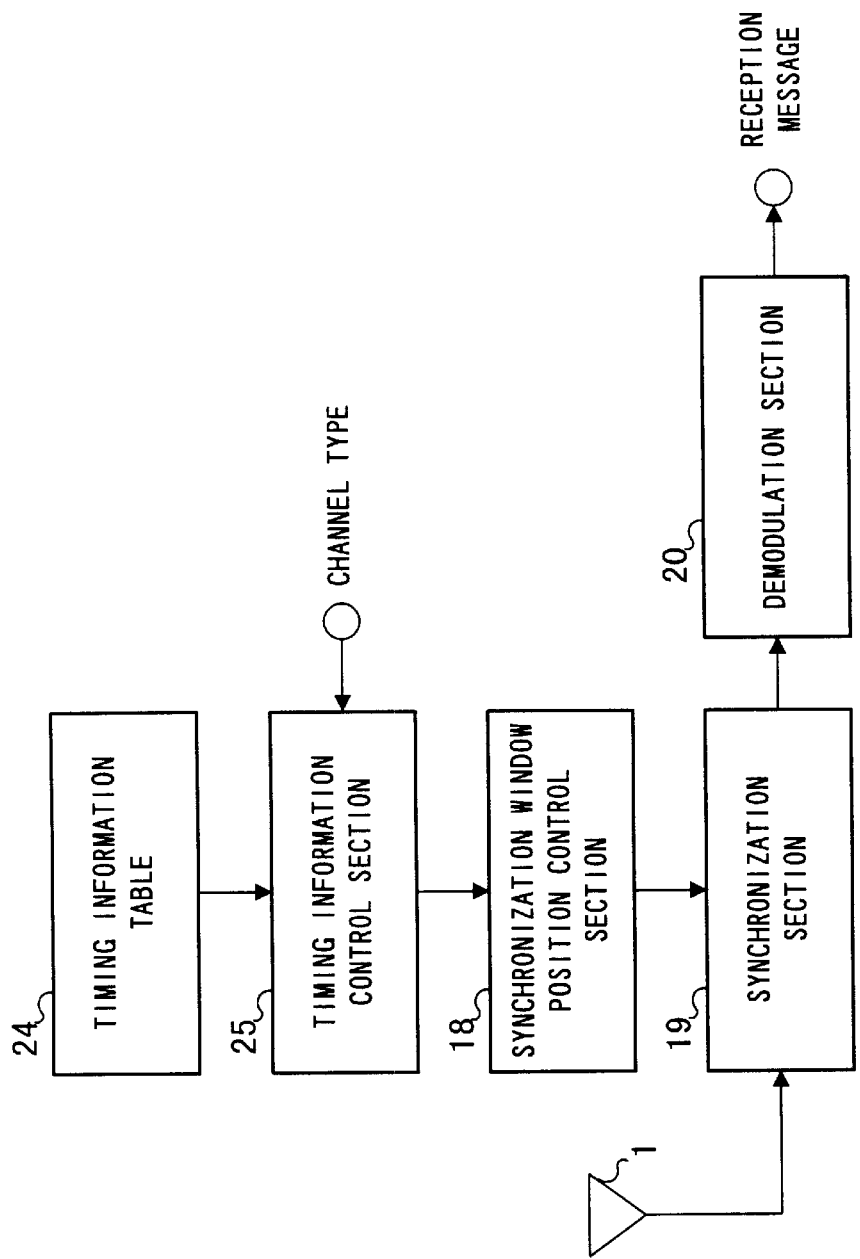
FIG. 20 is a block diagram showing a radio communication apparatus of Embodiment 11 of the present invention.

FIG. 20 is a block diagram showing a radio communication apparatus of Embodiment 11 of the present invention. This radio communication apparatus mainly comprises timing information table 24, timing information control section 25, synchronization window position control section 18, synchronization section 19 and demodulation section 20.

In the radio communication apparatus configured as shown above, a signal is received from reception antenna 1. Timing information control section 25 controls synchronization section 19 according to the type of the channel received with reference to reception channel information and timing information table 24. Synchronization section 19 changes the synchronization window position according to control by synchronization window position control section 18. Demodulation section 20 demodulates the received signal according to synchronization control by synchronization section 19 and outputs a reception message.

FIG. 21 shows a timing information table. This timing information table 24 is a transmission timing table when the radio communication apparatus (transmission apparatus) transmits control channels at the same transmission timing as that of an interference station and only transmits transmission channels with a transmission timing offset.

While a control channel has a transmission timing offset value of 0 bits, a communication channel has a transmission timing offset value of 3 bits. For example, when a control channel is changed to a communication channel, timing information control section 25 references this table and changes the synchronization window position to 3 bits.

In this configuration even if the transmission timing of the transmitter changes, the receiver controls the synchronization window position with reference to the timing information table, capable of accelerating synchronization even if the transmission timing has been changed.

The above embodiments can be implemented in appropriate combinations thereof. That is, the transmission timing detection section and transmission timing control section can change their detection and control targets from a desired mobile station, interference mobile station, interference station and self station in a variety of forms and apply them.

As explained above, prior to a communication between the self station and desired mobile station, the radio communication apparatus and radio communication method of the present invention starts communications by controlling the transmission timing from the mobile station of the self station so as to provide an offset over the transmission timing from the mobile station of a peripheral transmission station. This makes it possible to extract a received signal from the mobile station of the self station even if the mobile station of the self station and mobile station of the peripheral transmission station use identical unique words.

Industrial Applicability

The present invention is best suited when a mobile station of the self station and mobile station of a peripheral transmission station use identical unique words.

What is claimed is:

1. A radio communication apparatus, comprising:
    an interference mobile station transmission timing detector that detects the transmission timing of an interference mobile station communicating with a peripheral station of a base station;
    a desired mobile station transmission timing calculator that determines the transmission timing of a desired mobile station communicating with the base station, the determined transmission timing of the desired mobile station provided with an offset over the transmission timing of the interference mobile station; and a desired mobile station transmission timing controller that controls the transmission timing of the desired mobile station according to the determined transmission timing of the desired mobile station.

2. The radio communication apparatus according to claim 1, wherein the desired mobile station transmission timing controller comprises a transmission timing information attachment device that attaches transmission timing control information to be transmitted by the desired station to a transmission signal from the base station to the desired mobile station.

3. The radio communication apparatus according to claim 1, wherein the desired mobile station transmission timing calculator calculates the mobile station transmission timing within a range in which transmission is not carried out outside a transmission slot assigned to the desired mobile station.

4. The radio communication apparatus according to claim 1, wherein the interference mobile station transmission timing detector comprises:
an interference station control channel transmission timing detector that detects only the transmission timing of the control channel of a transmission signal transmitted from the interference station to the interference mobile station.

5. The radio communication apparatus according to claim 1, wherein the desired mobile station transmission timing controller comprises a communication channel transmission timing controller and a control channel transmission timing controller, and only changes the transmission timing of communication channels between the desired mobile station and interference mobile station and does not change the transmission timing of control channels between the desired mobile station and interference mobile station.

6. The radio communication apparatus according to claim, 1, wherein the desired mobile station transmission timing calculator calculates the mobile station transmission timing that has an offset value that varies from one station to another.

7. The radio communication apparatus according to claim 1, wherein the desired mobile station transmission timing calculator calculates the desired mobile station transmission timing in such a way that the transmission timing of the desired mobile station goes behind that of the interference mobile station.

8. A radio communication apparatus, comprising:
an interference mobile station transmission timing detector that detects the transmission timing of a interference mobile station;
a desired mobile station transmission timing calculator that determines the transmission timing of the desired mobile station, the determined transmission timing of the desired mobile station provided with an offset over the transmission timing of the interference mobile station; and
a desired mobile station transmission timing controller that controls the transmission timing of the desired mobile station according to the determined transmission timing of the desired mobile station.

9. A radio communication apparatus, comprising:
an interference mobile station transmission timing detector that detects the transmission timing of an interference mobile station;
a desired mobile station transmission timing detector that detects the transmission timing of a desired mobile station;

a desired mobile station transmission timing calculator that determines the transmission timing of the desired mobile station, the determined transmission timing of the desired mobile station provided with an offset over the transmission timing of the interference mobile station; and
a base station transmission timing controller that controls the transmission timing of the base station according to the determined transmission timing of the desired mobile station.

10. A radio communication apparatus, comprising:
an interference station transmission timing detector that detects the transmission timing of an interference station;
a desired mobile station transmission timing detector that detects the transmission timing of a desired mobile station;
a desired mobile station transmission timing calculator that calculates the transmission timing of the desired mobile station, the calculated transmission timing of the desired mobile station provided with an offset over the transmission timing of the interference station; and
a base station transmission timing controller that controls the transmission timing of the base station according to the calculated transmission timing of the desired mobile station.

11. A radio communication apparatus, comprising;
an interference mobile station transmission timing detector that detects the transmission timing of an interference mobile station;
a base station transmission timing detector that detects the transmission timing of the base station;
a desired mobile station transmission timing calculator that determines the transmission timing of a desired mobile station, the determined transmission timing of the desired mobile station provided with an offset over the transmission timing of the interference mobile station; and
a base station transmission timing controller that controls the transmission timing of the base station according to the determined transmission timing of the desired mobile station.

12. A radio communication method, comprising:
detecting the transmission timing of an interference mobile station communicating with a peripheral station of a base station;
determining the transmission timing of a desired mobile station communicating with the base station, the determined transmission timing of the desired mobile station provided with an offset over the transmission timing of the interference mobile station; and
controlling the transmission timing of the desired mobile station according to the determined transmission timing of the desired mobile station.

13. The radio communication method according to claim 12, comprising:
attaching transmission timing control information to be transmitted by the desired station to a transmission signal from the base station to the desired mobile station.

14. The radio communication method according to claim 12, wherein determining the transmission timing of the desired mobile station calculates the mobile station transmission timing within a range in which transmission is not carried out outside a transmission slot assigned to the desired mobile station.

15. The radio communication method according to claim 12 wherein detecting the interference mobile station transmission timing comprises:

detecting only the transmission timing of the control channel of a transmission signal transmitted from the interference station to the interference mobile station.

16. The radio communication method according to claim 12, which only changes the transmission timing of communication channels between the desired mobile station and interference mobile station and does not change the transmission timing of control channels between the desired mobile station and interference mobile station.

17. The radio communication method according to claim 12, wherein determining the desired mobile station transmission timing calculates the mobile station transmission timing that has an offset value that varies from one station to another.

18. The radio communication method according to claim, 12, wherein determining the desired mobile station transmission timing calculates the desired mobile station transmission timing in such a way that the transmission timing of the desired mobile station goes behind that of the interference mobile station.

19. A radio communication method, comprising:

detecting the transmission timing of an interference mobile station;

detecting the transmission timing of a desired mobile station;

determining the transmission timing of the desired mobile station, the determined transmission timing of the desired mobile station provided with an offset over the transmission timing of the interference mobile station; and controlling the transmission timing of the desired mobile station according to the determined transmission timing of the desired mobile station.

20. A radio communication method, comprising:

detecting the transmission timing of an interference station;

detecting the transmission timing of a desired mobile station;

determining the transmission timing of the desired mobile station, the determined transmission timing of the desired mobile station provided with an offset over the transmission timing of the interference station; and controlling the transmission timing of a base station according to the transmission timing of the desired mobile station.

21. A radio communication method, comprising:

detecting the transmission timing of an interference station;

detecting the transmission timing of a desired mobile station;

determining the transmission timing of the desired mobile station, the determined transmission timing of the desired mobile station provided with an offset over the transmission timing of the interference station; and controlling the transmission timing of the base station according to the transmission timing of the desired mobile station.

22. A radio communication method, comprising;

detecting the transmission of timing of an interference mobile station;

detecting the transmission of a base station;

determining the transmission timing of a desired mobile station, the determined transmission timing of the desired mobile station provided with an offset over the transmission timing of the interference mobile station; and controlling the transmission timing if the base station according to the transmission timing of the desired mobile station.

* * * * *

UNITED STATES PATENT AND TRADEMARK OFFICE
CERTIFICATE OF CORRECTION

PATENT NO. : 6,463,261 B1
DATED : October 8, 2002
INVENTOR(S) : K. Hiramatsu et al.

It is certified that error appears in the above-identified patent and that said Letters Patent is hereby corrected as shown below:

<u>Column 18,</u>
Line 2, after "interference" insert -- mobile --.
Line 9, after "interference" insert -- mobile --.
Line 11, before "transmission" insert -- determined --.
Line 22, "the" (second occurrence) should be -- a --.
Line 26, delete "of" (first occurrence).
Line 28, after "transmission" insert -- timing --.
Line 34, "if" should be -- of --.
Line 39, following claim was omitted and should be included:
-- a radio communication method, which carries out communications with a desired mobile station and changes a second transmission timing to have an offset over a first detected transmission timing obtained from at least one detected transmission timing selected from a group of base station, desired mobile station, interference station and interference mobile station --.

Signed and Sealed this

Twenty-ninth Day of April, 2003

JAMES E. ROGAN
*Director of the United States Patent and Trademark Office*